US009229451B2

(12) United States Patent
Bradley

(10) Patent No.: US 9,229,451 B2
(45) Date of Patent: Jan. 5, 2016

(54) LOCOMOTION OF AMORPHOUS SURFACE ROBOTS

(71) Applicant: U.S.A. as represented by the Administrator of the National Aeronautics and Space Administration, Washington, DC (US)

(72) Inventor: Arthur T. Bradley, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 27 days.

(21) Appl. No.: 14/189,019

(22) Filed: Feb. 25, 2014

(65) Prior Publication Data

US 2014/0180524 A1 Jun. 26, 2014

Related U.S. Application Data

(62) Division of application No. 13/342,264, filed on Jan. 3, 2012, now Pat. No. 8,662,213.

(60) Provisional application No. 61/431,168, filed on Jan. 10, 2011.

(51) Int. Cl.
*B25J 11/00* (2006.01)
*G05D 1/02* (2006.01)
*B62D 57/00* (2006.01)
(Continued)

(52) U.S. Cl.
CPC ................ *G05D 1/021* (2013.01); *B62D 57/00* (2013.01); *B62D 57/021* (2013.01); *B64G 1/16* (2013.01)

(58) Field of Classification Search
CPC ....... G05D 1/0272; A61K 8/92; G05B 15/00; A61F 5/14; B62D 57/05; H04R 25/00; B25J 11/00
See application file for complete search history.

(56) References Cited

U.S. PATENT DOCUMENTS 5,788,002 A 8/1998 Richter
6,137,891 A * 10/2000 Porrazzo et al. .............. 381/408
8,245,799 B2 8/2012 Chiel et al.
(Continued)

OTHER PUBLICATIONS

Zimmermann, K., et al., “Ferrofluid-based Flow Manipulation and Locomotion System,” Journal of Intelligent Material Systems and Structures, Oct. 2010, pp. 1559-1562, vol. 21.

*Primary Examiner* — Helal A Algahaim
*Assistant Examiner* — Michael Fouche
(74) *Attorney, Agent, or Firm* — Andrea Z. Warmbier

(57) ABSTRACT

An amorphous robot includes a compartmented bladder containing fluid, a valve assembly, and an outer layer encapsulating the bladder and valve assembly. The valve assembly draws fluid from a compartment(s) and discharges the drawn fluid into a designated compartment to displace the designated compartment with respect to the surface. Another embodiment includes elements each having a variable property, an outer layer that encapsulates the elements, and a control unit. The control unit energizes a designated element to change its variable property, thereby moving the designated element. The elements may be electromagnetic spheres with a variable polarity or shape memory polymers with changing shape and/or size. Yet another embodiment includes an elongated flexible tube filled with ferrofluid, a moveable electromagnet, an actuator, and a control unit. The control unit energizes the electromagnet and moves the electromagnet via the actuator to magnetize the ferrofluid and lengthen the flexible tube.

12 Claims, 5 Drawing Sheets

10 50 100 14 21 11 18 19 22 24 16 20 15 13 12

(51) Int. Cl.
*B62D 57/02* (2006.01)
*B64G 1/16* (2006.01)

(56) References Cited

U.S. PATENT DOCUMENTS 8,316,970 B1 * 11/2012 Tran .............................. 180/7.1
2008/0083571 A1 4/2008 Troy
2008/0145428 A1 * 6/2008 Zheng .......................... 424/487
2008/0164079 A1 7/2008 Jacobsen
2008/0257615 A1 * 10/2008 Xie et al. ...................... 180/8.7
2010/0094463 A1 * 4/2010 Okabayashi et al. ......... 700/264
2011/0131838 A1 * 6/2011 Pas et al. ........................ 36/140

* cited by examiner

Rest 1
Pump
Recirculate
Rest 2
10
11
13F
13R
26
28
30
32
34
38

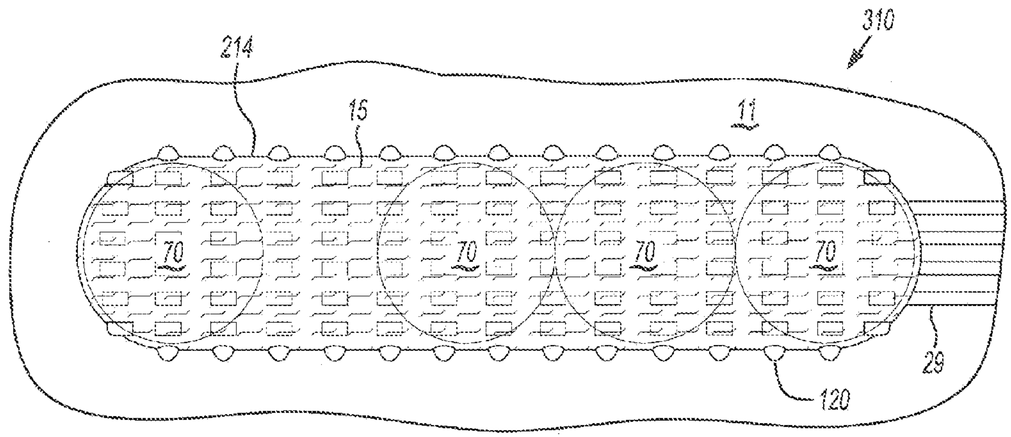
Fig-5
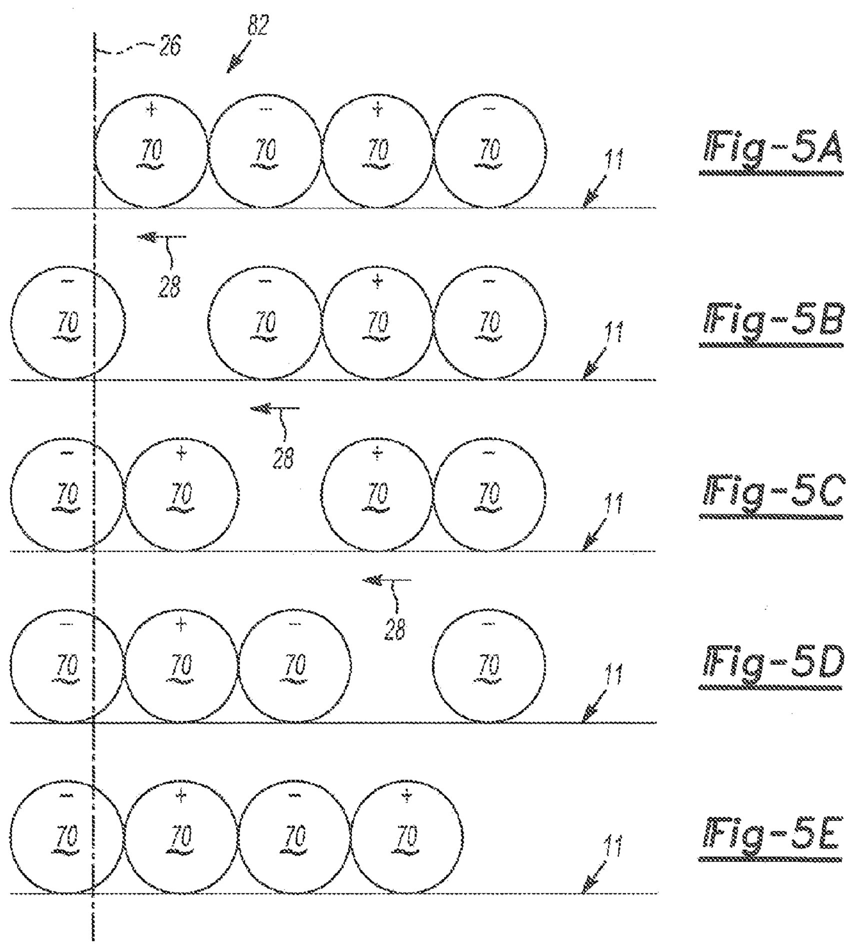

LOCOMOTION OF AMORPHOUS SURFACE ROBOTS

CROSS-REFERENCE TO RELATED APPLICATIONS

This application is a divisional of U.S. patent application Ser. No. 13/342,264, filed Jan. 3, 2012, which claims the benefit of U.S. Provisional Patent Application No. 61/431,168, filed on Jan. 10, 2011. Each of the foregoing applications is hereby incorporated by reference in its entirety.

STATEMENT REGARDING FEDERALLY SPONSORED RESEARCH OR DEVELOPMENT

The invention described herein was made by an employee of the United States Government, and may be manufactured and used by or for the Government for Government purposes without the payment of any royalties thereon or therefore.

TECHNICAL FIELD

The present disclosure relates to the locomotion of amorphous robots.

BACKGROUND OF THE INVENTION

Robots are electromechanical devices that perform work tasks automatically or autonomously. Robots are used in a host of applications, many of which present unique design challenges. For instance, complex surface-roving robots generally referred to as "rovers" may be used in space exploration missions as well as in Earth-based search and rescue operations. Controlled via remote link, rovers can employ an array of sensors to collect and analyze soil samples, measure the atmospheric composition and weather conditions, and collect high-resolution imagery of the surface terrain over an extended period, often in relatively inhospitable operating environments. NASA's Mars Pathfinder rover Sojourner and the more recent twin Mars Exploration rovers Spirit and Opportunity are examples of some space exploration rovers.

Once deployed on a surface, conventional rovers are typically propelled along a surface. In particularly sandy or loamy soil environments such as the lunar or Martian surfaces, conventional propulsion devices may become fouled and stuck. Rovers may therefore avoid exploring certain terrain features, or they may be programmed to follow a less than optimal route. Likewise, in some Earth-based roving applications, miniature rovers may be used to search through unstable piles of rubble or confined areas that are inaccessible to human search teams. Conventional rover designs may be less than optimal in these applications due to certain design limitations that may cause the rovers to become irretrievably stuck in the rubble or other difficult to navigate surface features.

SUMMARY OF THE INVENTION

An amorphous surface robot is disclosed herein. In its various embodiments, the amorphous robot provides improved surface mobility. As used herein, the term "amorphous robot" refers to a robot lacking a rigidly defined and unchanging shape. The presently disclosed robots change shape in the direction of intended travel to provide improved surface mobility along with enhanced protection from the elements.

The presently disclosed amorphous robot designs rely on one or more of the following principles: (1) the circulation of fluid in the desired direction of travel via a fully enclosed valve assembly; (2) the sequential switching of polarity of one or more fully enclosed electromagnets; and/or (3) the sequential expansion and deflation of an active material-based polymeric sac or cell. All disclosed robot designs enable movement with respect to a solid surface, as opposed to movement through free space or a liquid operating environment, without the use of wheels, tracks, or legs. All designs are fully scalable, and thus can be readily adapted as needed to the particular application and operating environment in which the robots are to be used.

In particular, an amorphous robot for use on a surface includes a supply of fluid, a bladder, a valve assembly, and a flexible outer layer. The bladder contains the supply of fluid and is divided into compartments. The valve assembly is in fluid communication with each of the compartments and includes a pump. The outer layer encapsulates the bladder and the valve assembly. The valve assembly selectively draws some of the fluid from at least one of the compartments and discharges the drawn fluid into a designated one of the compartments to displace the designated compartment with respect to the surface. This moves the amorphous robot in the direction of the discharge.

Another amorphous robot includes a plurality of elements each having a variable property, a flexible outer layer that encapsulates the plurality of elements, and a control unit in electrical communication with the elements. The control unit selectively energizes a designated one of the elements to change the variable property of that element, thereby moving the designated element with respect to the remaining elements. The robot thus moves with respect to the surface in the direction of movement of the designated element.

The elements in one embodiment are electromagnetic spheres, and the variable property is the magnetic polarity of the electromagnetic spheres. Alternatively, the elements may be polymer cells such as shape memory polymer (SMP) cells. In such an embodiment, the variable property maybe a variable shape and/or size of the SMP cells.

Yet another embodiment of the present amorphous robot includes an elongated flexible tube filled with ferrofluid and having a longitudinal axis, a moveable electromagnet positioned with respect to the elongated flexible tube, an actuator, and a control unit. The actuator is connected to the electromagnet and selectively moves the electromagnet. The control unit is electrically connected to the moveable electromagnet and to the actuator. The control unit energizes the electromagnet and moves, via the actuator, the electromagnet in a first direction with respect to the longitudinal axis. This magnetizes the ferrofluid and thereby lengthens the flexible tube in the first direction. The control unit then de-energizes the electromagnet to thereby de-magnetize the ferrofluid and thus shorten the flexible tube in the first direction. This moves the robot in the first direction with respect to the surface, in a manner similar to that of a worm which extends in a desired direction, grips the surface, and then pulls its trailing portion forward.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic top view illustration of yet another amorphous robot that uses a series of sequentially-activated electromagnets for propulsion.

FIG. 5A is a schematic side view illustration of a portion of the robot of FIG. 5 in a resting state.

FIG. 5B is a schematic side view illustration of the robot of FIG. 5A in a first stage of motion.

FIG. 5C is a schematic side view illustration of the robot of FIGS. 5A and 5B in a second stage of motion.

FIG. 5D is a schematic side view illustration of the robot of FIGS. 5A-C in a third stage of motion.

FIG. 5E is a schematic side view illustration of the robot of FIGS. 5A-D in another resting state.

DETAILED DESCRIPTION OF THE INVENTION

Figure 1:
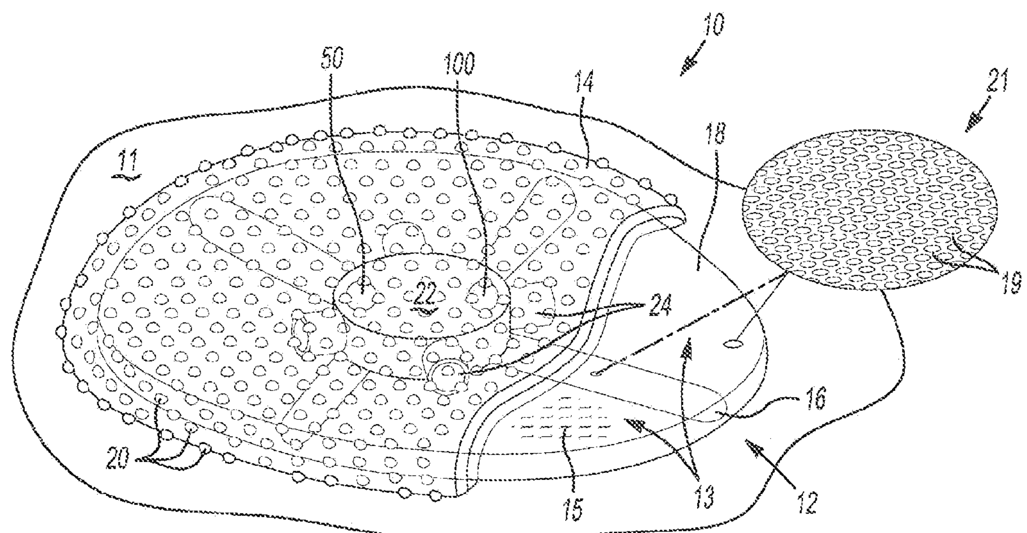
FIG. 1 is a schematic partial cut-away perspective top view illustration of an example amorphous robot having a fluid-filled compartmentalized bladder and an enclosed valve assembly.

Referring to the drawings, wherein like reference numbers correspond to like or similar components throughout the several figures, an amorphous robot 10 is shown in FIG. 1. The robot 10 is positioned with respect to a surface 11, for instance a terrestrial surface or a lunar, Martian, or other extraterrestrial surface. The robot 10 includes a valve assembly 22 and a bladder 12, the latter defining a plurality of compartments 13. An outer layer 14 fully encapsulates the bladder 12 such that the bladder 12 is completely shielded and thus isolated from dirt or debris of the surface 11 and the surrounding atmosphere. A portion of the outer layer 14 is removed in FIG. 1 to more clearly illustrate the structure of the bladder 12 encapsulated by the outer layer 14.

The outer layer 14 may include surface asperities 20 which form pseudopodia (false feet). Asperities 20 may be, by way of example, surface features such as nodules, fingers, or bumps. The asperities 20 extend from the robot 10 to grip the surface 11 and thus facilitate movement of the robot 10. As temperatures can vary widely on a given surface 11, all materials of construction should be selected to properly match the conditions of the intended operating environment.

The robot 10 may include a control unit 50, an example of which is described in greater detail below with reference to FIG. 1A. The control unit 50 may be enclosed within the valve assembly 22 and/or electrically connected thereto. A sensor 100 may be attached to the robot 10. Such a sensor 100 may draw power from the control unit 50. The valve assembly 22 may also include a plurality of fluid ports 24. Each fluid port 24 may be positioned within a respective one of the compartments 13. That is, the number of ports 24 may equal the number of compartments 13 in one embodiment. Control of the valve assembly 22 for movement of the robot 10 with respect to the surface 11 is described below with reference to FIG. 2.

Each of the various compartments 13 may contain a variable amount of fluid 15. Four compartments 13 are shown in the non-limiting example embodiment of FIG. 1. More or fewer compartments 13 may be provided in other designs, with at least two compartments 13 required for basic front-to-back or side-to-side motion. Regardless of the number of compartments 13, the valve assembly 22 is in fluid communication with each of the compartments 13. The valve assembly 22 ultimately controls the flow of fluid 15 between the different compartments 13 so as to move the robot 10 in a desired direction. The ports 24 are shown schematically in FIG. 1 for simplicity. Those of ordinary skill in the art will recognize that the actual ports 24 would have a length, shape, and orientation within the compartments 13 sufficient for ensuring that each compartment 13 can be substantially vacated or filled with fluid 15 as needed.

Each compartment 13 of the robot 10 may be separated from adjacent compartments 13 by a compartment wall 16, for instance a fluid-permeable wall in the form of a membrane or mesh, or an impermeable/solid wall. Surfaces 18 of the bladder 12, including or excluding the compartment wall 16 depending on the embodiment, may be configured to allow the fluid 15 to gradually flow at a closely controlled rate from one compartment 13 to another. As shown in the inset 21, the surfaces 18 may be a membrane, mesh, or other porous and/or fluid-permeable material defining pores 19. The pores 19 may be of a calibrated size and/or number so as to gently and gradually equalize fluid pressure in the various compartments 13 after completing a fill of a designated compartment 13, as will be explained below with reference to FIG. 2.

Figure 1A:
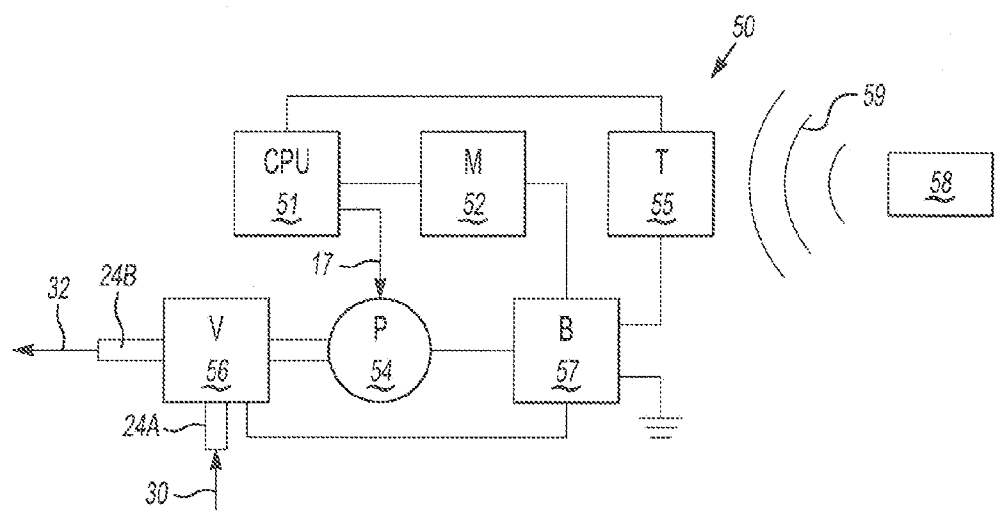
FIG. 1A is a schematic illustration of an example control unit for use with the amorphous robot shown in FIG. 1.

Referring to FIG. 1A, in one possible example the control unit 50 of FIG. 1 may include a microprocessor or CPU 51, memory (MEM) 52, a fluid pump (P) 54, a transceiver unit (T) 55, a valve body (VB) 56, and a battery (B) 57. The control unit 50 may be at least partially constructed in some embodiments as a micro-electromechanical system (MEMS), as is understood in the art. The pump 54 is electrically connected to the battery 57, for instance a lithium ion, nickel cadmium, or other single or multi-cell rechargeable battery or any other suitable power supply. The battery 57 may be recharged using solar power in some embodiments, e.g., using a solar panel (not shown). Such a design may help to extend the operating life of the robot 10 of FIG. 1, and may be advantageous for reducing the weight/size of battery 57.

The pump 54 may be energized via the battery 57 in response to a command signal (arrow 17) from the CPU 51. When energized, the pump 54 draws fluid 15 (see FIG. 1) from one compartment 13 through an inlet fluid port 24A as indicated by inlet arrow 30. The pump 54 may then circulate the fluid 15 through the valve body 56 before discharging the fluid 15 through an outlet fluid port 24B to another compartment 13 as indicated by outlet arrow 32.

The transceiver 55 of FIG. 1A, which may be used in all embodiments disclosed herein, may receive a set of control signals 59 from a source 58. The control signals 59 may be, by way of example, a set of mission control signals broadcast from a ground-based or an orbiting control platform. Thus, the source 58 may be an orbiting module in remote downlink/ uplink wireless communication with the robot 10, or the source 58 may be a conventional rover from which the robot 10 is deployed.

For instance, a conventional rover may carry the robot 10 to a difficult to navigate terrain feature such as a rock-strewn crater, deploy the robot 10, and communicate with the robot 10 as the robot 10 moves into the crater and performs a work task. The robot 10 may periodically establish a communications link with the source 58, download program instructions for a particular task sequence to memory 52, execute the instructions via the CPU 51, and repeat the process as needed. Alternatively, all required instructions may be pre-loaded in memory 52 to provide greater autonomy of action by the robot 10 and/or to conserve the battery 57.

Figure 2:
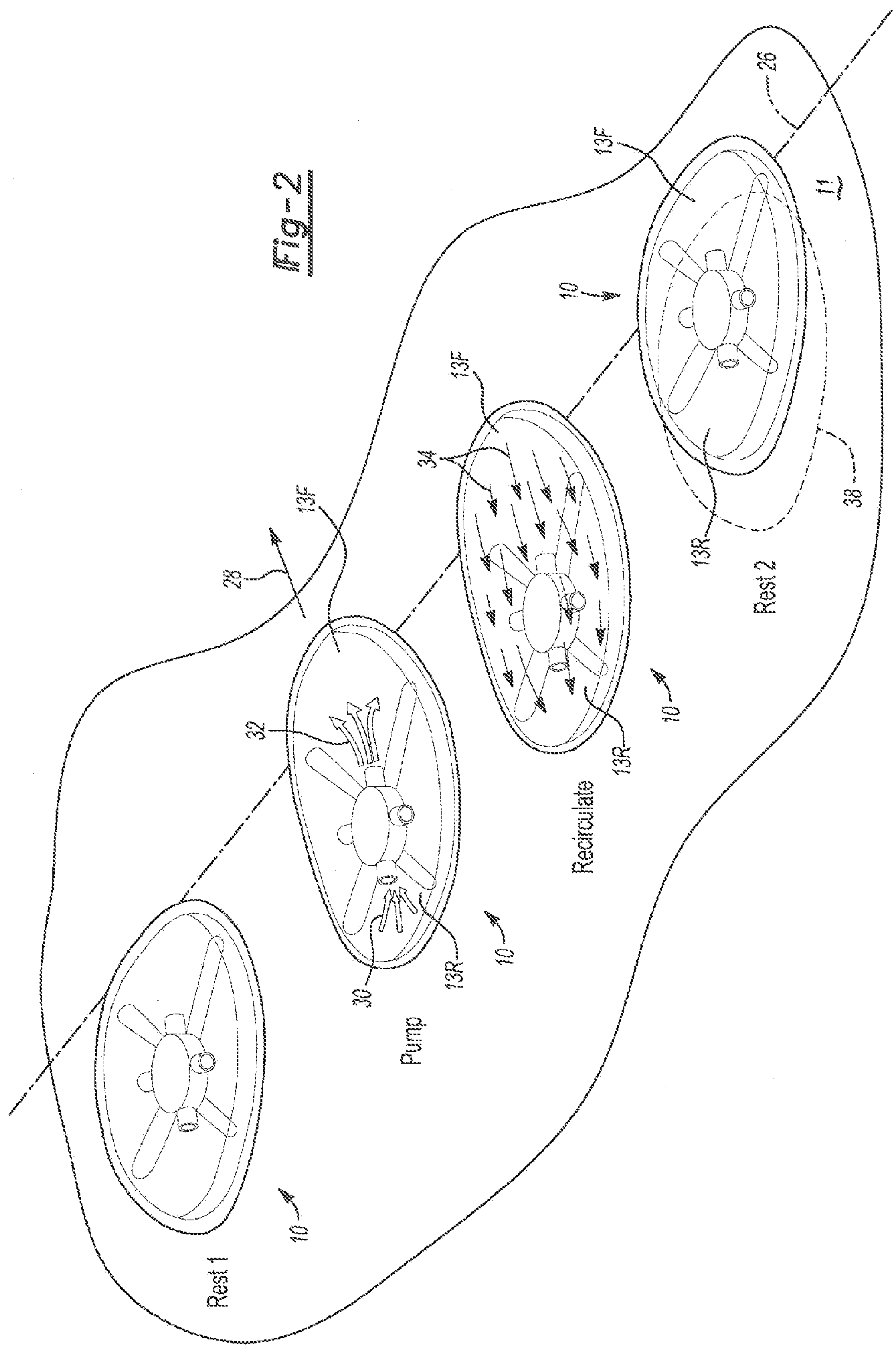
FIG. 2 is a schematic illustration of an example movement sequence of the amorphous robot shown in FIG. 1.

Referring to FIG. 2, locomotion of the amorphous robot 10 of FIG. 1 with respect to surface 11 is explained with respect to a reference line 26 on the surface 11. When at position "Rest 1" the robot 10 is adjacent to the reference line 26. The valve assembly 22 of FIG. 1 is inactive, and fluid 15 shown in the same Figure is about equally distributed within the various compartments 13. The pumping stage (Pump) shown in FIG. 2 is entered when motion is desired. As shown in FIG. 1A, the command signal (arrow 17) is transmitted to the pump 54. In response, the fluid 15 of FIG. 1 is drawn into the valve assembly 22 from a rear compartment 13R as indicated by inlet arrows 30. This fluid 15 is then discharged into a forward compartment 13F as indicated by outlet arrows 32, with the term "forward" here used to mean "opposite the rear compartment 13R", and thus the actual compartment 13F could be a side or rear compartment in an absolute sense. In other words, the actual direction of motion will vary with the particular compartment 13 being filled. As a result of filling the forward stage 13F, the mass of the robot 10 is displaced across the reference line 26 in the direction of arrow 28.

At the recirculation phase (Recirculate), fluid 15 discharged into the forward compartment 13F gradually returns to the other compartments 13, 13R as indicated by flow return arrows 34. This equalizing return flow occurs by virtue of the pores 19 of the material 18 as shown in FIG. 1. The diameter, number, and spacing of the various pores 19 may be selected to provide the desired rate of equalization as noted above. Alternatively, the valve assembly 22 of FIG. 1 may be configured to allow fluid 15 to slowly flow back through itself to the various compartments 13 at a controlled rate. While pressure equalization is progressing, the asperities 20 of FIG. 1 continue to grip the surface 11 and thereby hold the robot 10 in place. The robot 10 of FIG. 2 then settles at a new rest position (Rest 2) forward of the original reference line 26. The original rest position (Rest 1) is indicated by trace 38. The above process can be repeated from the new rest position (Rest 2).

Figure 3A:
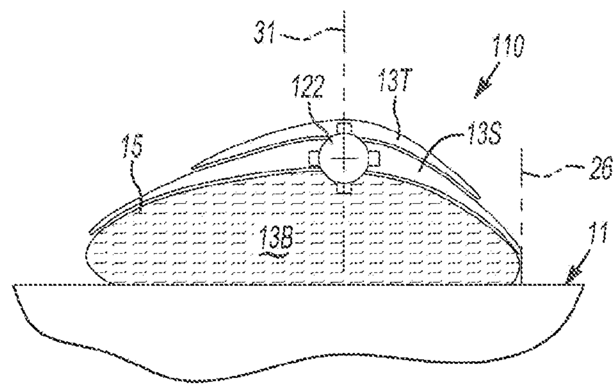
FIG. 3A is a schematic side view illustration of an alternative embodiment of the amorphous robot of FIG. 1 having a vertically-oriented valve assembly, with the robot shown in a resting state.

Referring to FIGS. 3A-D, the amorphous robot 10 of FIG. 1 may be alternatively configured as an amorphous robot 110 having a vertically-oriented valve assembly 122. That is, unlike the valve assembly 22 of FIG. 1 in which the axes of the various fluid ports 24 are substantially parallel to the surface 11, two of the fluid ports 24 of the valve assembly 122 of FIGS. 3A-D have a common axis 31 that is substantially perpendicular to the plane of the surface 11 when the robot 110 is at rest on a flat surface as shown in FIG. 3A. The term "substantially perpendicular" in one embodiment refers to a range of about 85° to about 95° with respect to the plane of the surface 11. The robot 110 of FIGS. 3A-D operates in much the same manner as the robot 10, but with a resultant rotational/tumbling action.

The robot 110 is shown in FIG. 3A as it appears relative to the reference line 26. A top compartment 13T is positioned above the valve assembly 122, a bottom compartment 13B is positioned below the valve assembly 122, i.e., closer to the surface 11 than the top compartment 13T, and side compartments 13S are positioned on either side of the valve assembly 122. Fluid 15 is contained within the bottom compartment 13B, and at negligible levels in the respective side and top compartments 13S and 13T. Thus, FIG. 3A represents an equilibrium starting condition.

Figure 3B:
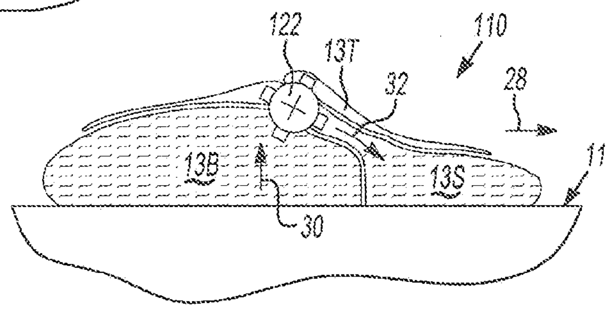
FIG. 3B is a schematic side view illustration of the amorphous robot of FIG. 3A in a partially filled motion state.
Figure 3C:
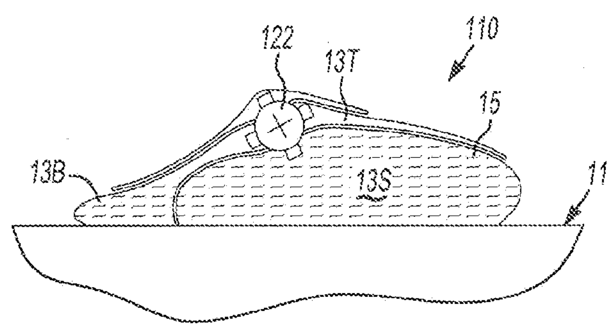
FIG. 3C is a schematic side view illustration of the amorphous robot of FIGS. 3A and 3B in a settling state.
Figure 3D:
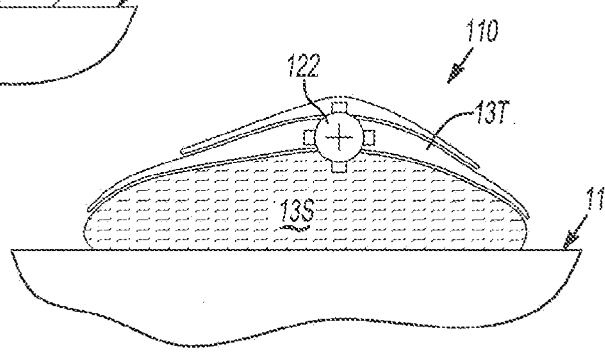
FIG. 3D is a schematic side view illustration of the amorphous robot of FIGS. 3A-C in another resting state.

In FIG. 3B, fluid 15 is drawn into the valve assembly 122 from the bottom compartment 13B as indicated by inlet arrow 30. The fluid 15 is then discharged into a desired side compartment 13S as indicated by outlet arrow 32. Fluid flow into side compartment 13S fills the side compartment 13S and empties the bottom compartment 13B. This causes the robot 110 to surge forward a bit with respect to the surface 11 as indicated by arrow 28. In FIG. 3C, with the desired one of the compartments 135 now substantially filled with fluid 15, the robot 110 begins to settle. The pumping action ceases. FIG. 3D represents the new starting position, with the robot 110 at rest a bit forward of its starting position represented in FIG. 3A. The process resumes with FIG. 3A, with compartment 13S of FIG. 3D now becoming the bottom compartment 13B of FIG. 3A.

Figure 4:
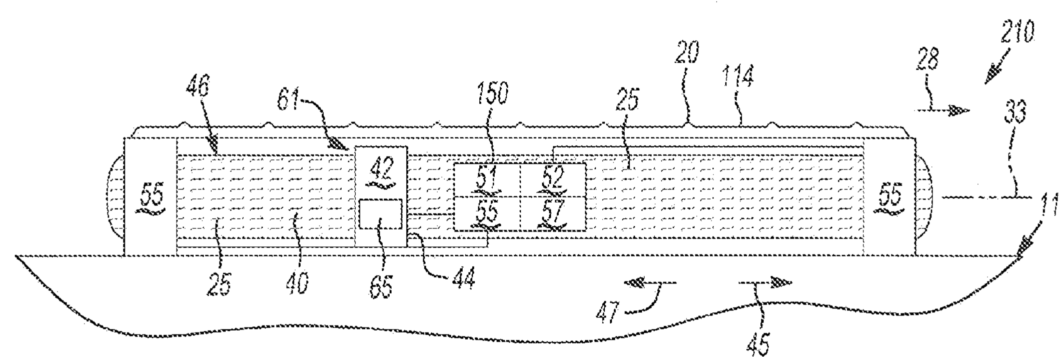
FIG. 4 is a schematic top view illustration of another amorphous robot that uses ferrofluid and a moveable electromagnet for propulsion.

Referring to FIG. 4, in yet another embodiment an amorphous robot 210 may include an elongated flexible inner tube 40 disposed within a flexible outer layer 114. The outer layer 114 may be similar to the outer layer 14 shown in FIG. 1, e.g., with similar materials and asperities 20 which grip the surface 11. The flexible tube 40 is filled with ferrofluid 25 and is circumscribed by a moveable electromagnet 42, for instance a ring. A gap (arrow 61) is defined between the inner tube 40 and the outer layer 114. Optionally, the gap (arrow 61) can be pre-pressurized with fluid or an inert gas to help maintain a calibrated space or standoff with respect to the electromagnet 42. This may facilitate axial movement of the electromagnet 42.

In a particular embodiment, lightweight end magnets 55 may be positioned at or toward either end of the inner tube 40, with the inner tube 40 and the outer layer 114 being affixed to both of the end magnets 55. The end magnets 55 can act as mechanical stops to extreme motion of the electromagnet 42 if needed, and can also provide an electromagnetic field whose polarity may be changed as needed by a control unit 150 to thereby create a magnetic field for assisting in the push-pull motion of the electromagnet 42, as will be understood by one of ordinary skill in the art.

The electromagnet 42 and the end magnets 55 of FIG. 4 may be electrically connected to the control unit 150 and positioned such that an inner surface 44 of the electromagnet 42 is positioned adjacent to an outer surface 46 of the inner tube 40. The control unit 150 may include sufficient memory 52 and a processor/CPU 51, along with a battery 57 and a transceiver 55 as explained above with reference to the control unit 50 of FIG. 1A. The control unit 150 may selectively move the electromagnet 42 via an actuator 65 as shown schematically in FIG. 4. As the outer layer 114 helps insulate and encapsulate the electromagnet 42, rotating or linearly translating parts may be employed as the actuator 65 without much concern for premature fouling of the actuator 65 by surface contaminants. Thus, one of ordinary skill in the art may envision various possible embodiments for the actuator 65, including but not limited to a motor, a motorized ball screw, a linear actuator, cables, and/or smart materials such as a shape memory alloy (SMA) wire.

The ferrofluid 25 filling the inner tube 40 of FIG. 4 may be any liquid which becomes strongly magnetized in the presence of an applied magnetic field. As is well understood by those of ordinary skill in the art, a ferrofluid typically contains a Brownian suspension of nanoscale ferromagnetic or ferrimagnetic particles in an organic solvent. Non-limiting example particles include magnetite and hematite. When magnetized by the electromagnet 42, the suspended particles align in the direction of magnetic flux and thus form a generally rigid clump at one end of the inner tube 40. That is, controlled movement of the energized electromagnet 42 in the direction of arrow 45 along the axis 33 of the tube 40 magnetizes the ferrofluid 25 and forces it toward one end of the tube 40, thus slightly lengthening the tube 40 in the direction of arrow 28.

Deactivation of the electromagnet 42 and return in the direction of arrow 47 to its starting position, with assistance of the actuator and any required field coordination with the end magnets 55, thus allows the robot 210 to gradually inch its way along the surface 11. Direction of motion may be changed via changing the polarity as needed of the various the end magnets 55 and the electromagnet 42. However, unlike the previous designs motion of the robot 210 if FIG. 4 is directionally limited to the axis 33. As will all of the present embodiments, the tube 40 may be connected to a sensor and deployed from a rover or other vehicle, or used separately from such a rover depending on the intended application. The motion of the robot 210 may be remotely controlled as explained above with reference to FIG. 1A.

Referring to FIG. 5, the polarity-changing locomotive approach of FIG. 4 may be applied to another amorphous robot 310. A plurality of elements 70 in the form of electromagnetic spheres are fully encapsulated within a flexible outer layer 214. The elements 70, referred to hereinafter as electromagnetic spheres 70 for clarity, have a variable property in the form of a variable magnetic polarity. The polarity of the electromagnetic spheres 70 may be sequentially changed to thereby move the robot 310 in a desired direction with respect to the surface 11.

As with the embodiments of FIGS. 1-4, asperities 120 may be provided on the outer layer 214 to help grip the surface 11, as indicated by the set of tracks 29 left in the soil of the surface 11. Fluid 15 may act as a damping fluid by filling the void between the electromagnets 70 and the outer layer 214. This may help in protecting the electromagnetic spheres 70 and damping the force of any collision adjacent electromagnetic spheres 70.

Referring to FIG. 5A, at rest with respect to the reference line 26, every other electromagnetic sphere 70 has the same polarity, e.g., an initial polarity sequence of (+, −, +, −) as shown. This alternating sequence acts to magnetically bind the electromagnetic spheres 70 to each other in a series, i.e., in line. As shown in FIG. 5A, the lead electromagnetic sphere 70, which is identified in FIG. 5A by arrow 82, is repelled in the direction of arrow 28 by changing its polarity such that the polarity matches that of the next electromagnet 70, here represented as a change from positive (+) to negative (−) polarity.

Likewise, changing the polarity sequence to (−, +, +, −) as shown in FIG. 5C magnetically repels the second electromagnetic spheres 70 away from the third electromagnetic spheres 70 in the sequence and toward the lead electromagnetic sphere 70. The process continues as shown in FIGS. 5D and 5E, with FIG. 5E representing the new starting position a bit forward of the reference line 26.

Figure 6:
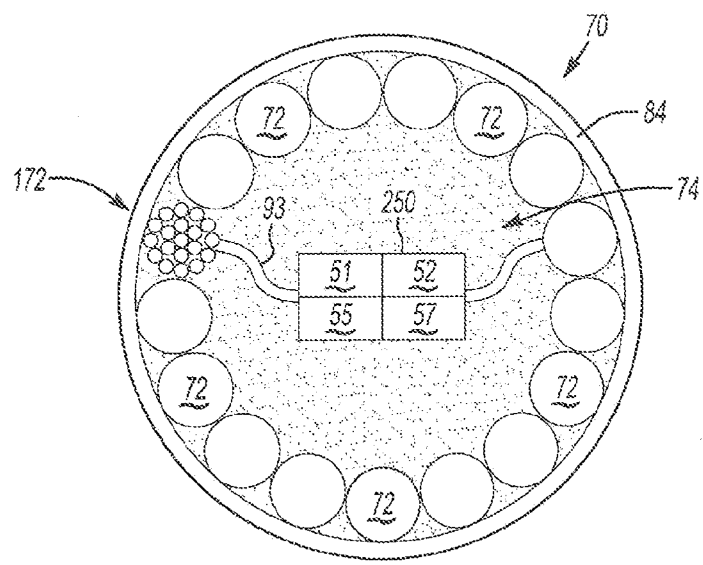
FIG. 6 is a schematic cross-sectional side view of an example electromagnet usable with the amorphous robot of FIGS. 5-5E.

Referring to FIG. 6, each electromagnetic sphere 70 may include a control unit 250 that selectively energizes a designated one of the electromagnetic spheres 70 to change the polarity of the designated electromagnetic sphere 70, thereby moving the designated electromagnetic sphere 70 with respect to the remaining spheres 70. The amorphous robot 310 thus moves with respect to the surface 11 in the direction of movement of the designated electromagnetic sphere 70.

The control unit 250 may include memory 52, a transceiver 55, and a battery 57. A microprocessor/CPU 51 may be included within at least one of the electromagnetic spheres 70 to provide top-level sequential control of the robot 310. The control unit 250 may be fully encapsulated by a magnetically neutral outer layer or shell 84. The shell 84 may define a core 74 of a suitable dielectric and thermal insulating material.

Conductive coils 72 may be wrapped with respect to the core 74. Coils 72 may be bundles of smaller wires as indicated by arrow 172. The internal detail is shown for only one coil 72 in FIG. 6 for illustrative simplicity. The coils 72 are electrically connected to the battery 57 of the control unit 250 by conductive leads 93. Changing the direction of flow of an electrical current through the coils 72, which can be selectively performed by the control unit 250 as understood in the art, thus changes the polarity of a given electromagnetic sphere 70 as needed, as will be appreciated by one of ordinary skill in the art. Controlled sequential polarity change is therefore used to provide the motion sequence shown in FIGS. 5A-E as described above.

Figure 7:
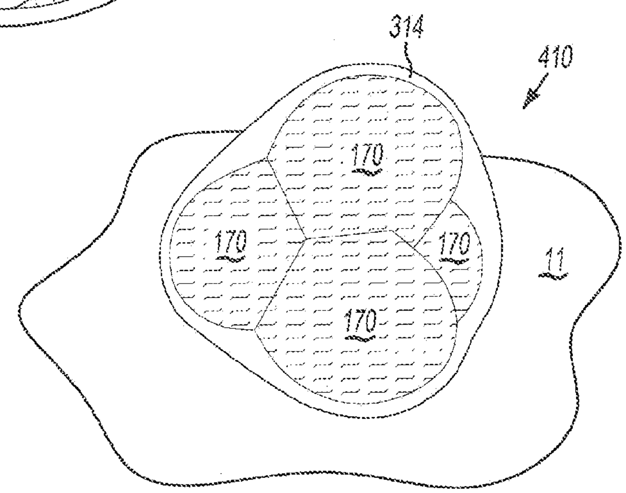
FIG. 7 is a schematic perspective side view illustration of an amorphous robot having a plurality of polymeric cells.

Referring to FIG. 7, in yet another embodiment an amorphous robot 410 may include a plurality of elements 170 in the form of polymeric cells, which hereinafter are referred to as cells 170 for clarity. The cells 170 are collectively encapsulated within a flexible outer layer 314. The outer layer 314 may be similar to the designs set forth above with reference to FIGS. 1-6 for outer layers 14, 114, and 214. The individual cells 170 may be formed from a shape-memory polymer (SMP) or other suitable shape-changing material. As is well understood in the art, SMPs are a polymeric class of smart materials that can return from a temporary deformed state to a permanent default shape when stimulated by an external stimulus. SMPs can thus maintain their temporary shape until a shape change back into the permanent form is activated by an applied stimulus, or by the termination of an applied stimulus depending on the embodiment.

By selectively changing the shape of a designated one of the cells 170, the robot 410 of FIG. 7 can be caused to rotate and thus tumble in a desired direction. The number and size/shapes of the cells 170 may vary with the design to provide the desired mobility. The cells 170 may be stimulated via heat and/or electricity or light depending on the embodiment. Therefore, the robot 410 may include a battery 57 as part of a control unit 350 as will now be described with reference to FIG. 8.

Figure 8:
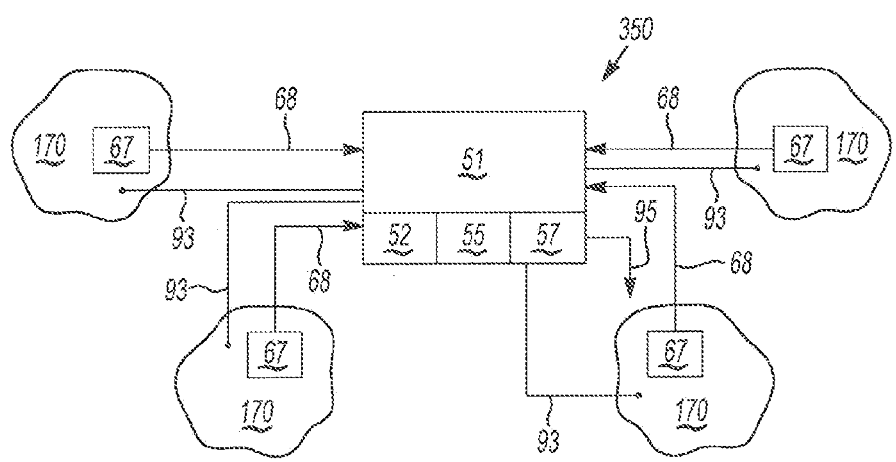
FIG. 8 is a schematic illustration of an example control unit usable with the amorphous robot shown in FIG. 7.

The control unit 350 of FIG. 8 is electrically connected to each of the cells 170 via a conductor 93, e.g., a length of wire or a coil. The control unit 350 may be disposed within one of the cells 170, wedged between the various cells 170, or otherwise enclosed by the outer layer 314. The control unit 350 may include a microprocessor or CPU 51, memory 52, a transceiver 55, and the battery 57.

As with the embodiment shown in FIG. 1A, which applies to all embodiments disclosed herein, a source 58 may transmit signals 59 to the robot 410 of FIG. 7, with the signals 59 received by the transceiver 55. The CPU 51 may then execute mission instructions communicated via the signals 59, or may download the same to memory 52 for later execution. Thus, when the robot 410 of FIG. 7 is to move in a desired direction, the CPU 51 can stimulate one of the cells 170 via transmission of a stimulus signal (arrow 95), as shown in FIG. 8. The shape of the cell 170 changes, e.g., increases in size, such that the robot 410 tumbles in a desired direction.

Because the gravitational pull toward surface 11 of FIG. 7 provides the motive force, a sensor pack 67 may be provided, e.g., in each polymer cell 170, to identify the position and orientation of cell 170. Sensor pack 67 may include a gyroscope, accelerometer, and/or any other sensor capable of determining, individually or collectively, the position of one cell 170 relative to the surface 11 and the other cells 170, and communicating the same as a position signal (arrow 68) to the control unit 350. Thus, the control unit 350 can determine the cell 170 having the optimal position for activation.

The cell 170 identified as being the best candidate cell for activation may be increased in size and/or changed in shape such that the cell 170 with the temporarily increased shape will fall toward the surface 11 and cause the robot 410 to topple. The cells 170 can be connected to each other such that movement of one cell pulls the other cells 170 in a particular direction, or the cells 170 can be different portions or regions of a single cell 170. In the latter embodiment, conductors 93 may be implanted in the different regions of the single cell 170 to provide the required response.

While the best modes for carrying out the invention have been described in detail, those familiar with the art to which this invention relates will recognize various alternative designs and embodiments for practicing the invention within the scope of the appended claims.

The invention claimed is:

1. An amorphous robot for use on a surface, the amorphous robot comprising:

a plurality of elements each having a variable property;

a flexible outer layer that encapsulates the plurality of elements;

a control unit in electrical communication with each of the plurality of elements;

wherein the control unit selectively energizes a designated one of the elements to change the variable property of the designated element, thereby moving the designated element in a direction of movement with respect to the remaining elements such that the amorphous robot moves with respect to the surface in the direction of movement of the designated element; and wherein each of the elements is a shape memory polymer (SMP) cell, and wherein the variable property is at least one of a variable shape and a variable size of the SMP cell;

wherein the control unit selectively transmits an electrical current into the designated element to change one of the variable shape and the variable size of the SMP cell; and a sensor pack that is encapsulated within each of the SMP cells in communication with the control unit, wherein each of the sensor packs transmits a position, signal to the control unit.

2. The amorphous robot of claim 1, wherein the flexible outer layer contains a supply of damping fluid.

3. The amorphous robot of claim 1, wherein each of the elements is an electromagnetic sphere, and wherein the variable property is the magnetic polarity of the electromagnetic sphere.

4. The amorphous robot of claim 3, wherein each of the electromagnetic spheres includes an outer shell and conductive coils, and wherein the control unit changes the magnetic polarity by changing the direction of flow of an electrical current through the conductive coils.

5. The amorphous robot of claim 1, wherein the flexible outer layer includes surface asperities which grip the surface to facilitate movement of the robot with respect to the surface.

6. An amorphous robot for use on a surface, the amorphous robot comprising:

a plurality of dements each having a variable property, wherein each of the elements is a shape polymer (SMP) cell, and wherein, the variable property is at least one of a variable shape and a variable size of the SMP cell;

a flexible outer layer that encapsulates the plurality of dements; and a control unit in electrical communication with each of the plurality of elements;

wherein the control unit selectively energizes a designated one of the elements to change the variable property of the designated element thereby moving the designated element in a direction of movement with respect to the remaining elements that the amorphous robot moves with respect to the surface in the direction of movement of the designated, element;

wherein each of the elements is a shape memory polymer (SMP) cell, and wherein the variable property is at least one of a variable shape and a variable size of the SMP cell;

wherein the control unit selectively transmits an electrical current into the designated element to change one of the variable shape and the variable size of the SMP cell; and a sensor pack that is encapsulated within each of the SMP cells in communication with the control unit, wherein each of the sensor packs transmits a position, signal to the control unit.

7. The amorphous robot of claim 6, further comprising a sensor pack that is encapsulated within each of the SMP cells in communication with the control unit, wherein each of the sensor packs transmits a position signal to the control unit.

8. The amorphous robot of claim 7, wherein the control unit selectively transmits an electrical current into the designated element to change one of the variable shape and the variable size of the SMP cell.

9. The amorphous robot of claim 7, wherein heat stimulates change to the variable shape and the variable size of the SMP cell.

10. The amorphous robot of claim 7, wherein light stimulates change to the variable shape and the variable size of the SMP cell.

11. The amorphous robot of claim 7, wherein the flexible outer layer includes surface asperities which grip the surface to facilitate movement of the robot with respect to the surface.

12. An amorphous robot for use on a surface, the amorphous robot comprising:

a plurality of electromagnetic spheres each having an outer shell and a conductive coil, wherein each of the electromagnetic spheres has a variable magnetic polarity;

a flexible outer layer that encapsulates the plurality of electromagnetic spheres, Where to the flexible outer layer includes surface asperities which, grip the surface to facilitate movement of the robot in a direction of movement with respect to the surface;

a control unit in electrical communication with each of the electromagnetic spheres;

wherein the control unit selectively changes a direction of flow of an electrical current through the conductive coil of a respective one of the electromagnetic spheres to thereby change the variable magnetic polarity of the respective electromagnetic sphere: thereby moving the respective electromagnetic sphere arid the robot in the direction of movement;

wherein each of the elements is a shape memory polymer (SMP) cell, and wherein the variable property is at least one of a variable shape and a variable size of the SMP cell;

wherein the control unit selectively transmits an electrical current into the designated element to change one of the variable shape and the variable size of the SMP cell; and a sensor pack that is encapsulated within each of the SMP cells in communication with the control unit, wherein each of the sensor packs transmits a position, signal to the control unit.

* * * * *